United States Patent [19]

Shimizu et al.

[11] 4,252,339
[45] Feb. 24, 1981

[54] VIBRATION PREVENTIVE RUBBER DEVICE FOR AUTOMOBILES

[75] Inventors: Toshihiko Shimizu, Yokohama; Michio Tokushige, Komaki, both of Japan

[73] Assignees: Nissan Motor Company, Limited; Tokai Rubber Industries Ltd., both of Japan

[21] Appl. No.: 72,245

[22] Filed: Sep. 4, 1979

[30] Foreign Application Priority Data

Sep. 4, 1978 [JP] Japan ............................ 53/121721

[51] Int. Cl.³ .......................................... B60G 7/02
[52] U.S. Cl. ................................. 280/673; 308/238
[58] Field of Search .............. 280/673, 660, 96.1; 267/140, 141, 152; 308/238, DIG. 8

[56] References Cited

U.S. PATENT DOCUMENTS

| | | | |
|---|---|---|---|
| 1,683,330 | 9/1928 | Chilton | 267/141 |
| 2,724,670 | 11/1955 | Mason | 267/141 |
| 3,139,275 | 6/1964 | Burkitt | 280/673 |
| 3,195,878 | 7/1965 | Rosky et al. | 280/673 |
| 3,520,554 | 7/1970 | Ravenel | 280/673 |

Primary Examiner—John J. Love
Assistant Examiner—Ross Weaver
Attorney, Agent, or Firm—Thompson, Birch, Gauthier & Samuels

[57] ABSTRACT

A vibration preventive rubber device for automobiles comprising a pair of cylindrical rubber bodies each of which has a low spring constant and is provided at its center with a circumferentially extending annular groove and provided at least one side of the annular groove with an annular laminated body having a high rigidity and including a canvas layer and a rubber body.

4 Claims, 7 Drawing Figures

VIBRATION PREVENTIVE RUBBER DEVICE FOR AUTOMOBILES

BACKGROUND OF THE INVENTION

1. Field of the Invention

This invention relates to a vibration preventive rubber device for automobiles.

2. Description of the Prior Art

A tension rod which is a constructional member of a front suspension for automobiles has one end secured through a bracket to an automobile body side member and the other end secured to a transverse link of the front suspension. Between the tension rod and the bracket are sandwiched a vibration preventive rubber device comprising a pair of rubber bodies for the purpose of cushioning shocks and vibrations subjected to the automobile body and hence improving a comfortable ride ability of the automobile without degrading the steering ability and stability during driving of the automobile.

As such vibration preventive rubber device as shown in FIG. 2A, it has heretofore been proposed to provide a device comprising two cylindrical rubber bodies 7, 7' arranged in the front and in the rear of a bracket 5 and extended through by a tension rod 6, the two rubber bodies 7, 7' being sandwiched between washers 8, 8' and firmly secured to the bracket 5 by means of lock nuts 9, 9' threadedly engaged with the tension rod 6.

Such rubber bodies 7, 7' function to exhibit compression deformation only so that their spring constant slowly changes as a function of the amount of deflection as shown by a curve C in FIG. 5. The amount of deflection becomes excessively large when the load subjected to the rubber bodies 7, 7' exceeds a given value, thereby inducing a mutual interference between suspension links.

In order to eliminate such drawback, it has also been proposed to insert synthetic resin blocks A, A' into the rubber bodies 7, 7' as shown in FIG. 2B. Such conventional device has a deflection-load characteristic shown by a curve A in FIG. 5. As can be seen from the curve A, such conventional device suddenly changes its deflection at a point P, thereby inducing a premature damage failure at the boundary edge portion between the rubber bodies 7, 7' and the synthetic resin blocks A, A'.

In order to eliminate such disadvantage, it has further been proposed to provide a vibration preventive rubber device comprising a pair of hand drum-shaped rubber bodies 10, 10' sandwiched between washers 11, 11' as shown in FIG. 3. In such conventional device, if water, oil or the like is penetrated into a gap formed between the rubber bodies 10, 10' and the washers 11, 11', the frictional coefficient therebetween becomes remarkably decreased. As a result, as shown in FIG. 4, a pressure receiving surface 10a of the rubber bodies 10, 10' tends to easily slide over a supporting surface 11a of the washer 11 so that the pressure receiving surface 10a is not stopped by a flange 12 of the washer 11, but rides thereon. If the load subjected to the rubber bodies 10, 10' is increased, the pressure receiving surface 10a springs the flange 12 and hence is removed out of it, thereby losing the spring ability inherent to the vibration preventive rubber. In addition, the pressure receiving surface 10a of the rubber bodies 10, 10' is damaged by the flange 12 to induce a premature damage failure of the vibration preventive rubber device and degrade the durability thereof. Concerning its spring constant, the vibration preventive rubber device shown in FIG. 3 has a deflection-load characteristic shown by a curve D in FIG. 5. The curve D is of slowly rising up non-linear one so that it is impossible to exhibit an excellent stopper effect which is important for the automobiles.

SUMMARY OF THE INVENTION

An object of the invention, therefore, is to provide a vibration preventive rubber device which can eliminate the above mentioned drawbacks which have been encountered with the prior art techniques.

A feature of the invention is the provision in a vibration preventive rubber device for automobile comprising a pair of cylindrical rubber bodies arranged in front and in the rear of a bracket interposed between a tension rod and an automobile body and extended through by said tension rod, said rubber bodies being sandwiched between washers and firmly secured to said bracket by means of lock nuts threadedly engaged with said tension rod, of the improvement in which each of said cylindrical rubber bodies is provided at its center with an annular groove extending circumferentially along the outer periphery thereof and provided at least one side of said annular groove with an annular laminated body extended through by said tension rod and including a canvas layer and a rubber layer, said laminated body having an outer surface extending to substantially the outer peripheral surface of said rubber bodies.

Further objects and advantages of the invention will be fully understood from the following detailed description with reference to the accompanying drawings, in which:

DETAILED DESCRIPTION OF THE PREFERRED EMBODIMENTS

Figure 1:
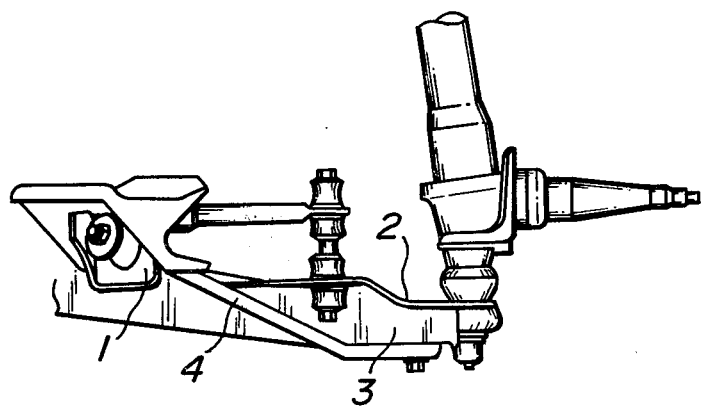
FIG. 1 is a perspective view of a front suspension for automobiles.
Figure 2A:
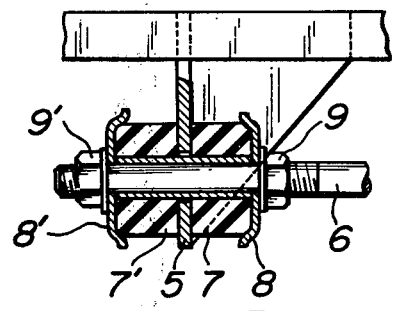
FIGS. 2A, 2B and 3 are longitudinal sectional views of conventional vibration preventive rubber devices.
Figure 2B:
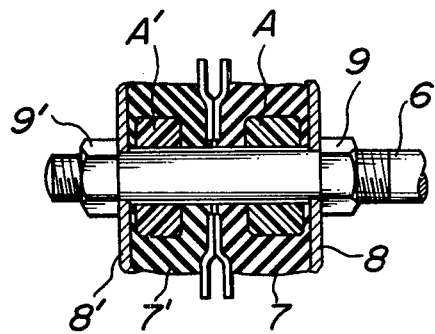
Figure 3:
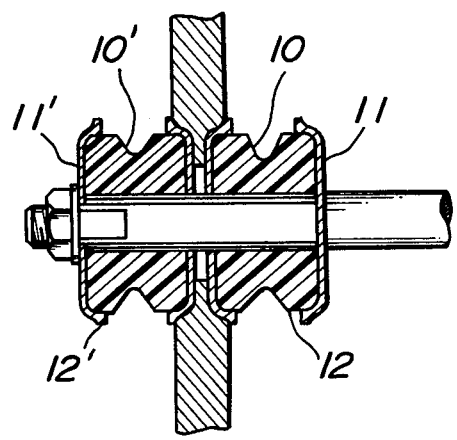

FIG. 1 shows one example of a front suspension 2 for automobiles. The front suspension 2 shown in FIG. 1 comprises a tension rod 4 having one end secured through a bracket 1 to an automobile body side member and the other end secured to a transverse link 3 of the front suspension 2. Between the tension rod 4 and the bracket 1 is sandwiched a vibration preventive rubber device comprising a pair of rubber bodies for the purpose of cushioning shocks and vibrations subjected to the automobile body and hence improving comfortable ride ability of the automobile without degrading the steering ability and stability during driving of the automobile.

Figure 6:
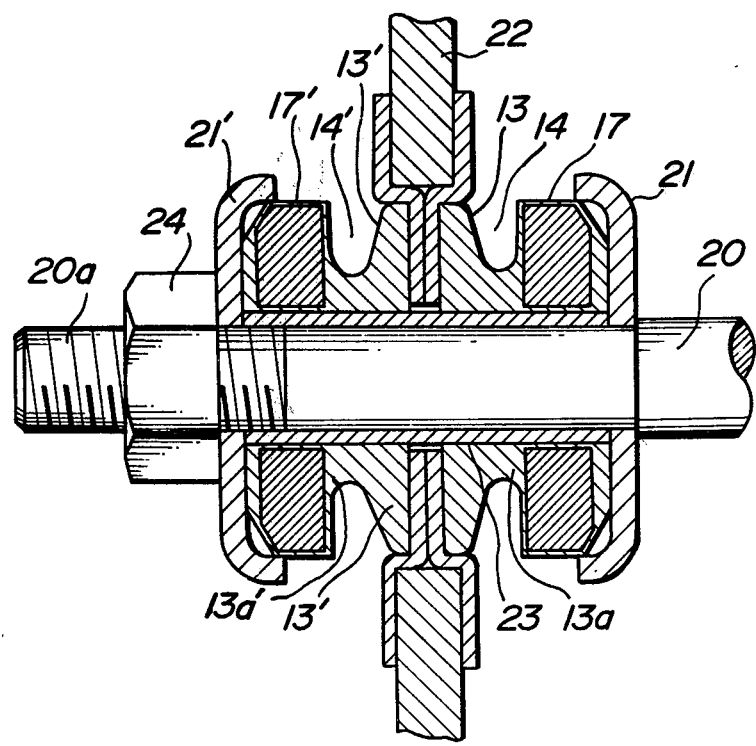
FIG. 6 is a longitudinal sectional view of one embodiment of a vibration preventive rubber device according to the invention.
Figure 7:
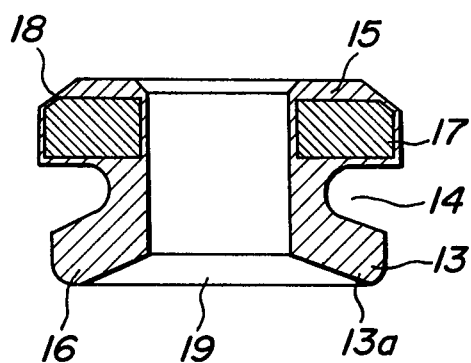
FIG. 7 is a cross-sectional view of a rubber body of the device shown in FIG. 6.

Referring now to FIGS. 6 and 7, there is shown one embodiment of a vibration preventive rubber device according to the present invention. Its rubber bodies per se is shown in FIG. 7. In the present embodiment, the device comprises a pair of cylindrical rubber bodies 13, 13' each of which is provided at its center with an annular groove 14, 14' extending circumferentially along the outer periphery thereof and hence forming seats 15, 16 as shown in FIG. 7. One of the seats 15 located at least one side of the annular groove 14 is provided with a disc-shaped laminated body composed of a canvas layer and a rubber layer alternately superimposed one upon the other and having an outer diameter which is substantially the same as that of the cylindrical rubber body.

In addition, the corners of the top end of one of the seats 15 are cut off for a suitable width so as to provide inclined edge 18. The other seat 16 is provided at its base surface with a cone-shaped concave portion 19 having a small depth.

In FIG. 6, reference numeral 20 designates a tension rod provided at its one end with a threaded portion 20a; 21, 21' show a pair of washers each having a center hole through which is extended the tension rod 20; 22 illustrates a tension bracket for supporting the tension rod 20 through the rubber bodies 13, 13'; 23 designates a collar interposed between the tension rod 20 and the rubber bodies 13, 13'; and 24 shows a lock nut threadedly engaged with the thread portion 20a of the tension rod 20.

The use of the rubber bodies 13, 13' each provided at its center with the annular groove 14, 14' extending circumferentially along the outer periphery thereof and provided at least one seat thereof with the disc-shaped laminated body having a rigidity which is higher than that of the rubber member and having an outer surface extending to substantially the outer peripheral surface of the rubber bodies provides the important advantage that the rubber bodies per se is flexible, that no edge portion is formed between the laminated body and the rubber bodies and hence the rubber bodies are not subjected to damage due to cutting whereby the durability of the device can be improved, and that the laminated body 17, 17' does not ride over the rubber receiving seats 21, 21' and neither spring out thereof and hence it is possible to maintain the spring property inherent to the vibration preventive rubber.

If the tension rod 20 is subjected to the axial load, in the low load region, all of the axial forces applied to the tension rod 20 is subjected to the rubber bodies 13a, 13a' having a low spring constant, while in the high load region, the main part of the load is subjected to the laminated bodies 17, 17' having a high rigidity. As a result, the load-deflection characteristic of the device according to the invention has no rapidly bending point.

That is, the device according to the invention has a rapidly rising up spring constant which functions to exhibit the stopper action and a non-linear spring characteristic which functions to sufficiently cushions shocks or vibrations without degrading the steering property and stability of the automobile during its driving.

Figure 5:
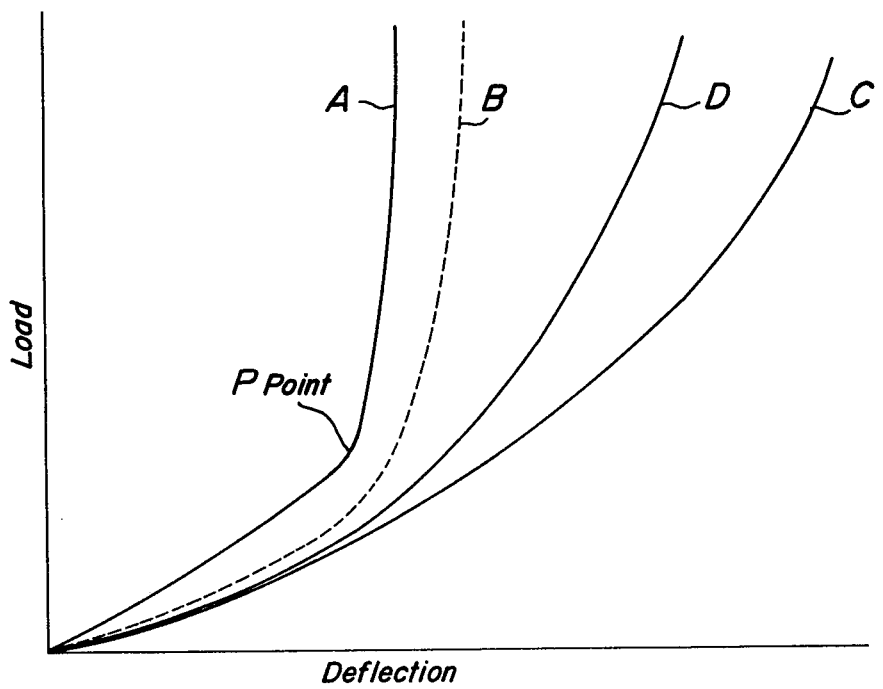
FIG. 5 is a graph illustrating load-deflection characteristics of the conventional vibration preventive rubber devices and of the vibration preventive rubber device according to the invention.
Figure 4:
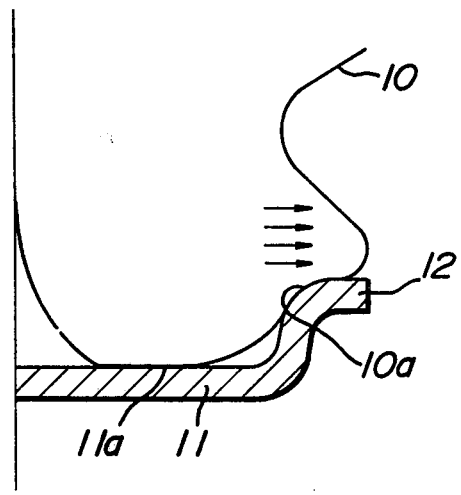
FIG. 4 is a diagrammatic view illustrating the operation of the conventional vibration preventive device shown in FIG. 3.

That is, the device according to the invention can improve the conventional load-deflection characteristics shown by the full line curves A, C, D in FIG. 5 to the load-deflection characteristic shown by dotted lines curve B which has a non-linear spring characteristic without having the bent point P which has been encountered with the prior art technique, thereby effectively absorbing shocks subjected to the automobile body.

In addition, it is possible to simultaneously vulcanize the laminated body and the rubber member so that the device according to the invention is less expensive and convenient in manufacture. In addition, any desired spring characteristic can be obtained by adjusting the number of canvas layers of the laminated body. The use of the laminated body composed of the canvas layer and the rubber layer alternately superimposed one upon the other ensures an improvement of the spring characteristic of the device and provides the important advantage that the pressure receiving surface of the rubber body does not excessively slide along the supporting surface of the washer, that the spring characteristic inherent to the device can be maintained, and that the durability of the device can be improved.

What is claimed is:

1. In a vibration preventive rubber device for automobiles comprising a pair of cylindrical rubber bodies arranged in the front and in the rear of a bracket interposed between a tension rod and an automobile body side member and extended through by said tension rod, said rubber bodies being sandwiched between washers and firmly secured to said bracket by means of lock nuts threadedly engaged with said tension rod, the improvement in which each of said cylindrical rubber bodies is provided at its center with an annular groove extending circumferentially along the outer periphery thereof and provided at least one side of said annular groove with an annular laminated body extended through by said tension rod and including a canvas layer and a rubber layer, said laminated body having an outer surface extending to substantially the outer peripheral surface of said rubber bodies.

2. The vibration preventive rubber device according to claim 1, wherein said laminated body is composed of a canvas layer and a rubber layer alternately superimposed one upon the other.

3. The vibration preventive rubber device according to claim 1, wherein said laminated body is of a disc-shaped one having an outer diameter which is substantially the same as that of said cylindrical rubber body.

4. The vibration preventive rubber device according to claim 1, wherein said laminated body and said rubber body are simultaneously vulcanized into one integral body.

* * * * *